United States Patent [19]

Ellis et al.

[11] 4,240,597
[45] Dec. 23, 1980

[54] WING WITH IMPROVED LEADING EDGE FOR AIRCRAFT

[75] Inventors: Roger R. Ellis; W. Marvin Gertsen; Norman E. Conley, all of Wichita, Kans.

[73] Assignee: Gates Learjet Corporation, Wichita, Kans.

[21] Appl. No.: 937,348

[22] Filed: Aug. 28, 1978

[51] Int. Cl.³ .............................................. B64C 3/14
[52] U.S. Cl. .................................. 244/35 R; 244/198; 244/199
[58] Field of Search ............... 244/198, 199, 200, 214, 244/35 R, 35 A, 34 R

[56] References Cited

U.S. PATENT DOCUMENTS

| 3,659,810 | 5/1972 | Robertson | 244/35 R |
| 4,032,087 | 6/1977 | Cleaves | 244/214 |
| 4,050,651 | 9/1977 | Neal et al. | 244/200 |

OTHER PUBLICATIONS

Whitcomb, "A Design Approach . . . for Wing-Tip Mounted Winglets", NASA TN 8260, 7/1976.
Ishimitsu et al., "Design Analysis of Winglets for Military Aircraft", AFFDL-7R-76-6, 2/1976.
Evans, "Leading Edge Contours for Thin Swept Wings", NACA RM A57B11, 3/1957.
Hickey et al., "Large-Scale Wind-Tunnel Tests . . .", NACA RM A58A09, 5/1958.

*Primary Examiner*—Galen L. Barefoot
*Attorney, Agent, or Firm*—H. W. Oberg, Jr.; Raymond Fink; Curtis H. Castleman, Jr.

[57] ABSTRACT

A thin, high performance swept wing of the tapered type with an improved leading edge characterized by a first portion that extends from near the wing root at a fixed radius to a transition point where twice the fixed radius does not exceed about 100.6 percent of wing thickness at about 5 percent of the local chord at the transition point, and a second leading edge portion extending from the transition point to the wing tip that has a radius expressed in percent of local chord which does not exceed that percent of local chord at the transition point. Winglets are optionally provided in combination with the wing with improved leading edge to provide in combination, improved aircraft performance.

6 Claims, 3 Drawing Figures

WING WITH IMPROVED LEADING EDGE FOR AIRCRAFT

BACKGROUND OF THE INVENTION

The invention relates to aeronautics, but more particularly, the invention relates to fixed leading edge lift and tip modification of sustaining airfoils (wings) which intrinsically combine to maintain reduced aircraft takeoff and landing air speeds without inhibiting performance at high subsonic Mach numbers (M).

An aircraft wing is shaped to provide a required lift with a least possible drag. However, the shape of the wing is compromised between that aerodynamic shape that is most effcient for aircraft cruising speed and that aerodynamic shape required for low air speeds such as encountered during takeoff and landing. Typically, high speed (e.g., $M \geqq 0.6$) wings are thin and require extensive movable surfaces that effect wing reshaping for low aircraft speeds (e.g., $M \leqq 0.15$). To compromise the difference between high and low speed lift and drag, wings are provided with various movable control surfaces such as trailing edge flaps or leading edge devices that are normally held in a passive retracted position at high cruising speeds but which are extended for low air speeds. Extendable leading edge devices offer more versatility than fixed leading edge devices because the movable leading edge devices effectively reduce the stall speed of a wing without hindering the thin wing profile required for high speed performance. However, movable leading edge devices may not be economically or otherwise feasible for some aircraft. Fixed leading edge devices and other fixed wing modifications may offer a better compromise. For example, a fixed leading edge device which offers a good compromise between high and low aircraft speeds is taught in U.S. Pat. No. 4,050,651.

Some devices affixed to a wing are known to enhance high lift, high speed wing performance. An example of such a device is an integral winglet extending from the tips of wings. A description and evaluation of such winglets appear in NASA Technical Note TN D8260 dated July, 1976 and AFFDL TR 76-6, dated February, 1976.

Airfoils are commonly defined by dimensionless coordinates where chord thickness (or height) is expressed in coordinate units from a chord having 100 units length. The leading edge radius is expressed as a fraction of chord length. Normally, leading edge radius is less than one percent of its local chord (i.e., the radius of a chord as taken anywhere across a wing semispan n). A wing with no taper (i.e., chord length at the wing root being the same as the chord length at the wing tip) would have identical leading edge radii dimensions. However, high speed wings are typically tapered causing the tip chord length to be less than the root chord length. Accordingly, the actual root chord leading edge radius dimension would be larger than the tip chord leading edge radius dimension for a tapered wing even though the leading edge radius expressed as a fraction of local chord would be a constant.

The recommended leading edge radius for an NACA 64 A-109 airfoil section is 0.58 percent of the local chord. A wing with a 275 cm root chord and a 100 cm tip chord would have a root leading edge radius of 1.59 cm and a tip chord leading edge radius of 0.58 cm.

NACA research memo A57B11 (FIG. 3) teaches a semispan variation of leading edge radius from about 0.6 percent at the root chord to 0.9 percent at 0.6 semispan and the tip chord. Using the same chord dimensions in the previous example, the wing would have a 1.65 cm leading edge radius at the root chord and a 0.9 cm radius at the tip chord. While a spanwise variation of leading edge radius and percent of local chord is taught, the leading edge radius is relatively small in relation to chord thickness or height.

However, U.S. Pat. No. 4,050,651 teaches a fixed dimension radius substantially across the wing span or semispan that is substantially large. In terms of percent of local chord, for example, using the 275 cm root chord and 155 cm tip chord, the leading edge radius is 1.25 percent of the chord at the wing root and 2.21 percent of the chord near the wing tip. While such a leading edge contour has been shown to be a good expedient for low speed wing performance, it does not define a maximum leading edge radius as a percent of local chord across a semispan so that wings of various taper ratio might have a maximum leading edge radius across a semispan without having a substantial deleterious affect on high and low speed aircraft performance.

This invention is directed to a fixed leading edge device for low speed performance, and a fixed winglet, for high lift, high speed performance, which combine to give improved low and high speed performance for a thin, high speed wing. More preferably, the invention is used with a modified NACA 64 A-109 airfoil in combination with a Gates Learjet type aircraft.

SUMMARY OF THE INVENTION

In accordance with the invention, an improved leading edge for a thin, high performance wing is provided. The leading edge is characterized by a first leading edge portion which extends from near a wing root with a fixed dimension radius to a transition point where twice said fixed radius does not exceed about 100.6 percent of the wing thickness at about 5 percent of the transition point local chord; and a second leading edge portion that extends from the transition point to the wing tip chord and having a radius in percent of local chord that does not exceed the percent of local chord radius at the transition point. Optionally, but preferably, the leading edge is used in combination with a winglet that extends from each wing tip. More preferably, the leading edge and winglet are used in combination with a modified NACA 64 A-109 airfoil as installed on a Gates Learjet type aircraft.

One aspect of the invention is directed to a thin, high speed wing having a fixed leading edge contour which neither substantially impedes slow speed performance nor substantially impairs high speed operation.

Another aspect of the invention is that drag penalties associated with the leading edge contour and its relatively large leading edge radius (e.g., in comparison to the NACA 64 A-109 airfoil) are more than offset at the higher lift coefficients by an improved ratio of lift to drag provided by winglets at each wing tip. The leading edge contour and winglets intrinsically combine to give an NACA 64 A-109 wing improved performance as measured by low and high speed aircraft performance and aircraft specific fuel consumption.

Accordingly, an object of the invention is to provide a fixed leading edge contour that enhances performance of a swept wing of the tapered type and more preferably a wing with an NACA 64 A-109 airfoil section.

Another object of the invention is to combine the wing and the modified leading edge with winglets at each wing tip.

An advantage is that a wing so modified with the leading edge contour in combination with the winglets give an aircraft improved performance as measured by: lower specific fuel consumption; low landing and takeoff speeds (i.e., $M \leq 0.15$); no substantial drag penalties at high lift, high air speeds (i.e., M about 0.6 to about 0.8); and improved stall speeds.

These and other objects or advantages of the invention will be apparent after reviewing the drawings and description thereof wherein:

FIG. 1 is an isometric view of an aircraft (e.g., a T-tail aircraft of the Gates Learjet type) including a wing with the leading contour of the invention in combination with winglets disposed at each wing tip;

FIG. 2 is a partial cross-sectional view taken generally along the line 2—2 of FIG. 1 showing the leading edge contour and dimensions expressed in percent chord at a transition point; and FIG. 3 is a chart showing a leading edge radius and its variation in relation to percent semispan and prior art (i.e., U.S. Pat. No. 4,050,651).

DESCRIPTION OF PREFERRED EMBODIMENTS

Figure 1:
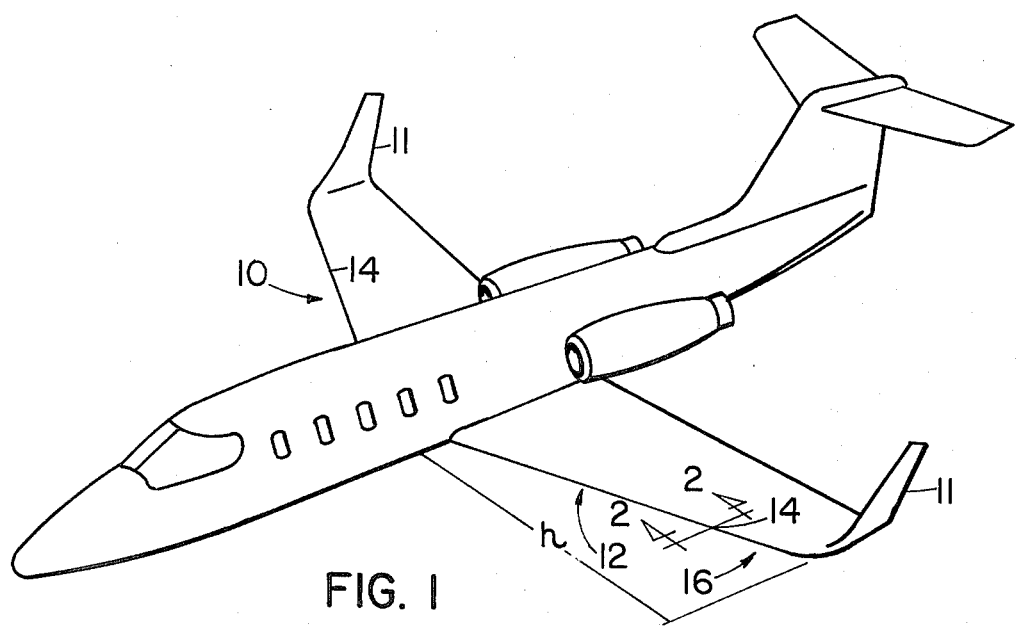

Referring to the Figures, an improved high performance wing 10 is provided and is shown installed on a T-tail aircraft such as of the Gates Learjet type as manufactured by the Gates Learjet Corporation.

The wing 10 is of the thin, high speed and tapered type and is more preferably defined as having: a 13 degree sweep at the quarter chord line; an aspect ratio of 6.72; a taper ratio of 0.39; and a dihedral angle of 2.5 degrees. More preferably, the wing has generally an NACA 64A-109 airfoil section that is modified generally at the lower surface at about the forward 15 percent of the chord line with the leading edge of the invention. Most preferably, the so modified wing has winglets 11 extending from each wing tip.

In accrodance with the invention, it has been determined that a substantially large leading radius can be maintained across a wing semispan when the semispan is increased and the tip chord becomes smaller with wing tapering.

The leading edge is divided into two portions across each semispan. A first portion 12 extends from near a wing root to a transition point 14 and a second portion 16 which extends from the transition point to near each wing tip. The transition point is located at least about 50 percent of semispan 17 and more preferably, at least about 70 percent to about 80 percent of semispan so that a major portion of the wing will have a large leading edge radius as will later become apparent. The first leading edge portion 12 has a fixed dimension radius selected from the range of about 1.12 percent to about 1.38 percent of the root chord, and more preferably, about 1.24 percent of the root chord. For example, a wing having a 275 cm root chord would have a first leading edge portion with a leading edge radius of 3.41 cm to the transition point (e.g., $0.0124 \times 275$). Should the leading edge radius be expressed in percent of local chord across the first portion of the semispan, it would linearly increase at a constant slope.

The method of expressing leading edge radius as a fixed dimension or as a percent of local chord does not give a relative indication between the relative size between the leading edge and thickness (or height) of a local chord.

Figure 2:
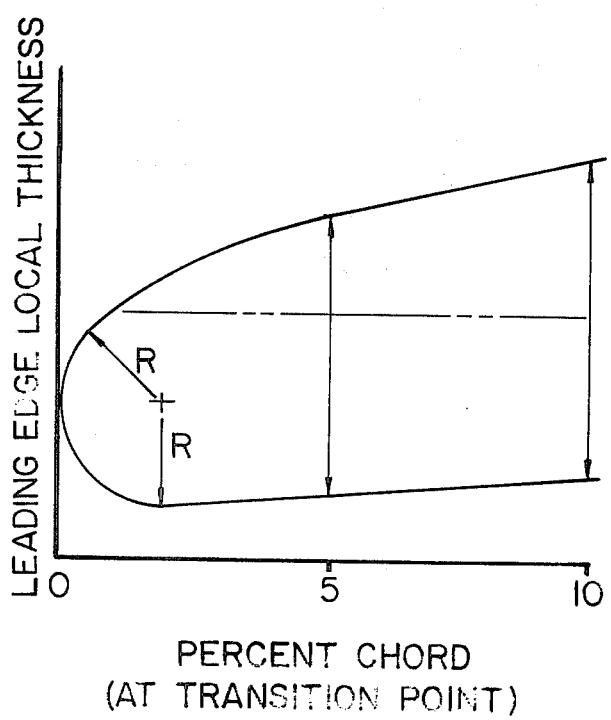

Referring more particularly to FIG. 2, the ratio of 2 times the leading edge radius R to the local section thickness (or height) as measured at 5 or 10 percent of the local chord, is a convenient factor for expressing such a thickness relationship.

It has been determined through test data that a maximum relationship between leading edge radius and local chord height exists where twice the fixed radius of the first leading edge portion does not exceed about 100.6 percent of the wing thickness as measured at about 5 percent of the local chord at the transition point or about 68 percent of the wing thickness at 10 percent of local chord. When the ratio exceeds the 100.6 percent value at 5 percent chord or 68 percent value at 10 percent chord, high speed wing performance is deleteriously affected by increased drag.

A second leading edge portion extends from the tranition point to the tip cord. The second leading edge portion has a radius which is more conveniently expressed in percent of local chord so that it does not exceed the percent of local chord radius at the transition point. More preferably, the percent radius of the second leading edge portion equals a constant.

Figure 3:
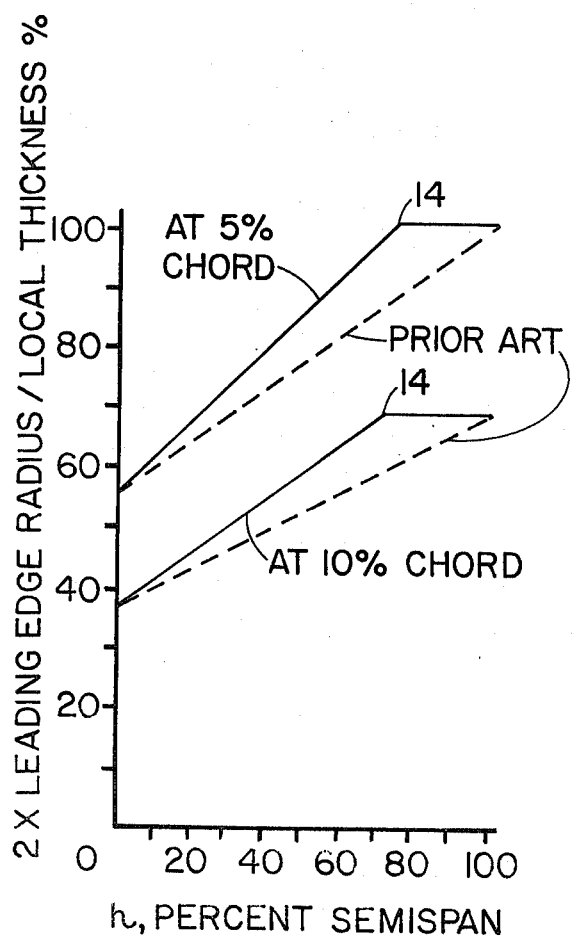

To further illustrate the relative thickness between the leading edge contour across the semispan, FIG. 3 shows in percent, 2 times the leading edge radius divided by local chord thickness at 5 and 10 percent of the local chord, as a function of semispan, in percent. Thus, FIG. 3 gives a relative thickness contour of the leading edge in comparison to chord size across the semispan. FIG. 3 also compares the leading edge contour in comparison to the prior art. It should be noted that FIG. 3 normalizes semispan and that the actual semispan length for the leading edge contour shown with the invention (2667 cm) was approximately 183 cm longer than the semispan shown in the prior art.

Winglets 11 extend from each wing tip at approximately 15 degrees from a vertical. The winglets are canted outboard from each other at their leading edge at approximately 4 to 11 degrees (i.e., 2 to 5.5 degrees for each winglet). Size of the winglet is as suggested in AFFDL Report TR 76-6. Using these guidelines, the winglet has a span from about 10 to about 20 percent of a wing semispan (e.g., 18 percent for the flight test data given herein) and has an aspect ratio from about 1.5 to about 2.5 and more preferably about 2.33.

The winglets take advantage of a characteristic vortex flow that occurs around each wing tip, When the local flow angle is positive, the resultant force of the winglet has a component into the aircraft free stream direction. The winglet acts like the sail of a yacht in making use of a cross-wind airflow to produce a resultant force which reduces the wing's induced drag. By taking advantage of the wing tip vortex flow, the winglets effect a drag reduction of up to about 7 percent.

The winglets intrinsically combine with the leading edge as previously described to provide improved aircraft performance at both high and low speeds. The relatively large leading edge contour provides the wing with capability of low air speeds during takeoff and landing. The winglets more than compensate for the drag penalty associated with the leading edge.

The improved performance offered by the invention may best be illustrated by comparing similar aircraft where one is equipped with the prior art wing as described in U.S. Pat. No. 4,050,651 and the other is equipped with the wing of the invention as above described. Both wings as tested were of the modified NACA 64 A-109 type contour. However, the wing of the invention had an increased span of 366 cm and did not include tip tanks and the 2,000 pounds of fuel as normally carried therein. The stall speed for the aircraft using the wing of the invention was 90 knots while the stall speed for the aircraft using the prior art wing was 94 knots. Such low stall speeds are indicative of good wing performance for takeoff and landing. Both aircraft have substantially the same range (i.e., 1370 naut. miles for the aircraft with the wing of the invention and 1458 naut. miles for the prior art aircraft), although the aircraft using the wing of the invention carried about 1426 pounds less fuel. Accordingly, the specific fuel consumption was much less (i.e., 1183 pounds per hour) than the comparable prior art aircraft (1527 pounds per hour).

The fixed leading edge radius as taught by U.S. Pat. No. 4,050,651 was studied for the entire semispan but it was determined that there was too much drag penalty caused by a large disproportioned size between the outboard portions of the wing and the size of its leading edge.

An inherent advantage of the invention is that stall speeds of the aircraft are improved.

The foregoing description is made for purpose of illustration only and is not intended to limit the scope of the invention which is to be determined from the appended claims.

What is claimed is:

1. A tapered wing of the high speed type with a semispan, root chord, tip chord and intermediate local chords, the wing semispan comprising:

a first wing portion extending from near the root chord to a transition point that is at least about fifty percent of semispan, the first wing portion with a leading edge having substantially a fixed radius selected from the range of about 1.2 percent to about 1.38 percent of the root chord, the transition point being where twice said fixed radius does not exceed about 100.6 percent of the wing thickness at about 5 percent of the local chord at the transition point; and a second wing portion extending from the transition point to the tip chord, the second wing portion with a leading edge having a radius in percent of local chord which substantially equals the percent of local chord radius at said transition point.

2. The wing as claimed in claim 1 wherein the wing is of the NACA 64 A-109 type.

3. The wing as claimed in claims 1 or 2 wherein each semispan has a winglet extending upward from near its tip chord.

4. The wing as claimed in claims 1 or 2 wherein the transition point is from about 70 to 80 percent of semispan.

5. A tapered wing of the NACA 64 A-109 type with symmetrical semispans, each having a root chord, tip chord and intermediate local chords, each wing semispan comprising:

a winglet extending upward from a semispan near the tip chord, the winglet having an aspect ratio from about 1.5 to about 2.5 and canted outboard at an angle no greater than about 5.5 degrees, the winglet having a span that is from about 10 percent to about 20 percent of the wing semispan;

a semispan leading edge contour comprising a first wing portion extending from near the root chord to a transition point beyond seventy percent of semispan, the first wing portion with a leading edge having substantially a fixed radius selected from the range of about 1.12 percent to about 1.38 percent of the root chord, the transition point being where twice said fixed radius does not exceed about 100.6 percent of the wing thickness at about 5 percent of the local chord at the transition point; and a second wing portion extending from the transition point to the tip chord, the second wing portion with a leading edge having a radius in percent of local chord which substantially equals the percent of local chord radius at said transition point.

6. The wing as claimed in claim 5 in combination with an aircraft of the Gates Learjet type.

* * * * *